Oct. 29, 1963 G. R. LEWIS 3,109,110
RECTIFIER-AMPLIFIER WITH BUILT IN CLIPPING
Filed Dec. 27, 1961
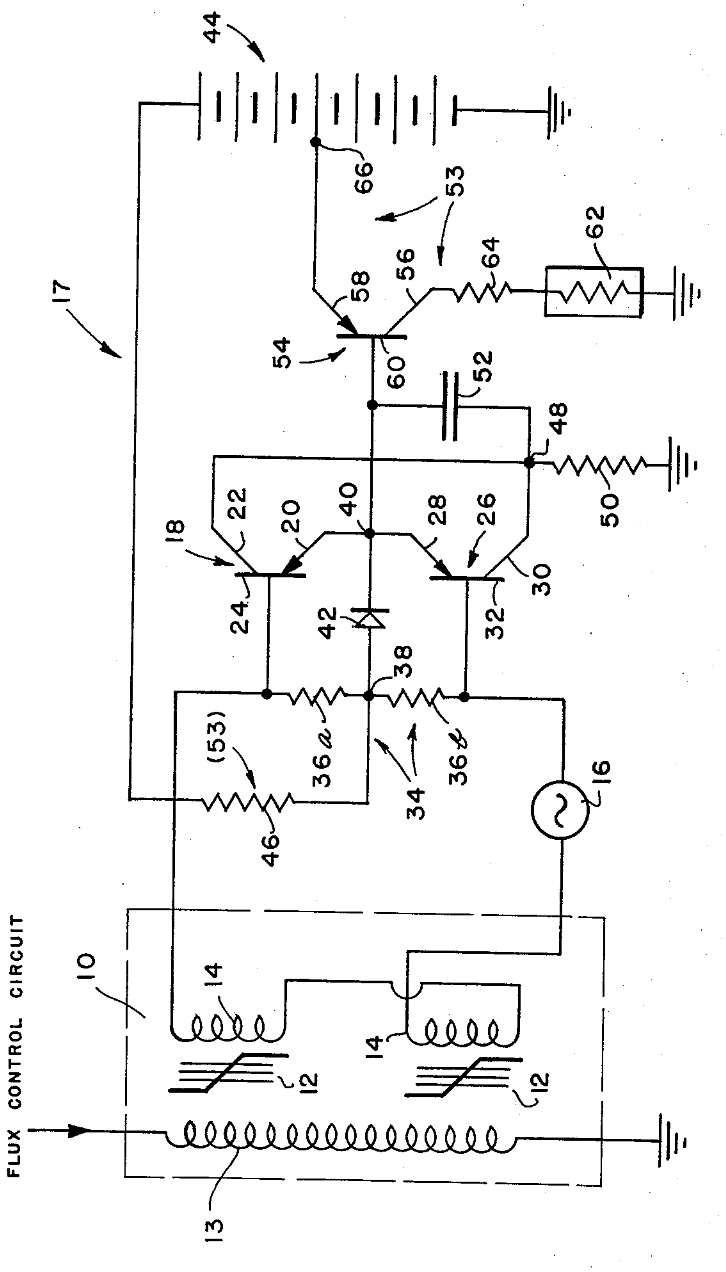
INVENTOR.
GEORGE R. LEWIS
BY
[signature]
ATTORNEY.

United States Patent Office 3,109,110
Patented Oct. 29, 1963

3,109,110

RECTIFIER-AMPLIFIER WITH BUILT IN CLIPPING

George R. Lewis, China Lake, Calif., assignor to the United States of America as represented by the Secretary of the Navy Filed Dec. 27, 1961, Ser. No. 162,620
6 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

The present invention relates to an improved rectifier and amplifier circuit of the type including an input level clipping feature to reject small quiescent state A.C. signals, and more particularly to such a circuit employing semi-conductors.

In certain forms of electrical control equipment, such as saturable reactor devices, control system error detection circuits, etc., the signal to actuate a control operation takes the form of a relatively abrupt rise in magnitude of alternating current from some small quiescent value. It is frequently desirable to convert such alternating current signal to direct current and to amplify or raise the power level of the direct current to drive the equipment to be controlled. Somewhere in the rectifier-amplifier system a clipping action of the input is necessary to reject the small quiescent signal. This clipping action also determines the minimum input signal or threshold at which the rectifier-amplifier operates. A circuit arrangement now commonly employed for such purpose consists of feeding the input signal into a conventional four diode full wave rectifying bridge and amplifying the D.C. output of the bridge in a separate D.C. amplification stage, such as is disclosed in copending application S.N. 784,002 of Donald H. Wheeler, filed December 30, 1958, Patent No. 3,011,714, and entitled "Settable Magnetic Integrator," and in the thrust cut-off and airframe separation control circuitry disclosed in copending application S.N. 8,201 of Orville J. Saholt and Donald Stoehr, filed February 11, 1960, and entitled "Rocket Thrown Missile." In such arrangements the inherent minimum voltage required across the bridge diodes for their conduction provides the clipping action and determines the threshold of the rectifier-amplifier.

While the aforesaid diode bridge D.C. amplifier arrangement is adequate for many usages, its threshold of operation is dependent upon the minimum forward voltages of the respective pair of series connected diodes which conduct during each half cycle of signal input and the threshold is therefore subject to twice the temperature sensitivity characteristic of each of the diodes. This is a very real disadvantage in usages where stability and uniformity of operation under a wide range of temperature are critical. The aforesaid copending application of Saholt and Stoehr is an example of a case where sensitivity of the threshold of operation to temperature changes is very critical. The control operation being performed therein is to terminate the flight of a rocket propelled weapon at a desired point along its normal ballistic path in response to the time integral of the missile acceleration. It can be shown that mathematical relationships of this type of control operation are such that variations in distance at which actuation will occur would increase as the arithmetic square of the variation of the threshold of operation of the rectifier-amplifier circuit.

Along with the above-mentioned problem is the ever present problem in control circuitry of providing greater reliability, reduction of control complexity and simplification in number and kinds of parts to be actuated before a desired control is obtained.

It is therefore an object of the present invention to provide a circuit for rectifying and amplifying A.C. control signals having a threshold of operation which is less sensitive to temperature changes than prior art devices.

Another object is to provide such circuit in which rectification and amplification and rejection of a quiescent level of signal is simultaneously effected in a single stage.

A still further object is to provide such a circuit which is reliable, simple in operation, and requires fewer parts than prior art devices.

Other objects and many of the attendant advantages of this invention will be readily appreciated as the same becomes better understood by reference to the following detailed description when considered in connection with the accompanying drawings wherein:

The single FIGURE is an electrical schematic of one form of rectifier-amplifier circuit in accordance with the teachings of the present invention, shown employed in conjunction with a saturable reactor switching device.

Referring now to the drawing, there is shown a saturable reactor switching device 10 having magnetic cores 12. "Switch over" action is effected by causing the core flux to change from an unsaturated state to a saturated state by means of any suitable flux control circuit, which may include a flux control winding 13 linked to the cores. To provide an electrical switching signal, a pair of output core-linked windings 14 are series connected with a source of A.C. potential 16. Before the cores 12 become saturated, windings 14 present a high impedance and the A.C. signal generated by source 16 through windings 14 is of a very low quiescent magnitude. However, upon cores 12 changing to their saturated condition the impedance of windings 14 sharply drops with a corresponding abrupt rise in magnitude of A.C. signal. The circuit thus far described is conventional.

The rectifier-amplifier circuit 17 of the present invention includes a pair of transistors consisting of a first transistor 18 having an emitter 20, collector 22 and base 24, a second transistor 26 having an emitter 28, collector 30 and base 32. Transistors 18 and 26 may be PNP transistors as shown by the accepted schematic symbol. The A.C. signal from the saturable reactor switch 10 is coupled to the transistors by a symmetrical double-ended input network such as a balanced center tapped impedance unit 34 series connected with windings 14 and A.C. source 16, which may be formed of impedance halves consisting of fixed resistances **36*a* and 36*b* joined at a junction point 38 forming the center tap of the impedance unit. Bases 24 and 32 are connected to the respective opposite ends of impedance unit 34, and emitters 20 and 28 are connected to a junction point 40. A diode 42 has its anode connected to junction point 38 and its cathode to junction point 40, forming a current flow path between the same in the forward direction of current through transistors 18 and 26, and also operating as a current switch to effect a clipping action as hereinafter described. Together, center tapped impedance unit 34 and diode 42 form a push-pull input network to transistors 18 and 26, driving their respective bases with signals of opposite polarities relative to the emitters during each half cycle of A.C. input signal. For example, during a half cycle when a positive potential appears at base 24 of transistor 18, a negative potential appears at base 32 of transistor 26. The relative polarities are then reversed during the succeeding half cycle. The bases 24 and 32 are at substantially the same D.C. potential as the emitters and it is a characteristic of transistor action that under these conditions a negative base voltage relative to the emitter tends to drive the transistor into conduction and a positive base voltage renders the transistor nonconductive or "cut off." Accordingly, the one and the other of the transistors tend to be alternatively conducting and cut off during each half cycle of the signal across impedance unit 34**. Also, when diode 42 is conductive, the impedance between center tap junction 38 and common terminal 40 is very low with the result that emitter current will provide negligible negative feedback. Under such conditions it is a characteristic of transistor action that the transistor gain is very high and the transistors may be readily driven into saturation, which helps in providing the abruptness of change desired in switch-over circuits. Center tap junction 38 is connected to the positive terminal of a battery 44 through a resistor 46; battery 44 being poled in such a manner as to apply the proper potentials to emitters 20 and 28 and bases 24 and 32 for transistor operation. Collectors 22 and 30 are connected to a common terminal 48 forming a push-push output for transistors 18 and 26 through the series circuit extending from terminal 48, a resistor 50, through ground return, battery 44, and thence returning to emitters 20 and 28 through the positive battery terminal and resistor 44 and diode 42. In this way the alternating conduction of the transistors 18 and 26 during one and the other half cycles of A.C. input signal are converted to unidirectional current pulses through the series circuit, providing simultaneous rectification and amplification of the A.C. signal. A capacitance 52 is connected between common terminals 40 and 48 to smooth the voltage ripples. Resistor 46 forms the load in such push-push driven series circuit, and its more particular function will be apparent from the operation of a later amplification stage 53 hereinafter described. However, for many usages satisfactory results may be obtained by connecting the equipment to be controlled directly in such series circuit. Resistor 50 is a current limiting resistor serving to protect the transistor against excess currents.

It is a characteristic of diode 42 that it is conductive only when a predetermined minimum voltage is applied thereacross in its forward direction of flow. In accordance with the present invention this diode characteristic is employed as a current switch between center tap junction 38 and common terminal 40. The diode appears as an open circuit to A.C. input signals of insufficient level to develop the necessary potentials across the respective impedance halves *36a* and *36b* to provide the minimum forward voltage of the diode in the respective emitter to base circuit of the transistors. Diode 42 therefore rejects or clips out all input signals below a predetermined level and since neither transistors 18 nor 26 may conduct with their base to emitter circuits open they are non-conductive or "cut off." Diode 42 is so chosen to become conductive when the A.C. signal from the circuit of windings 14 reaches a predetermined level. For example, excellent circuit results have been obtained employing a diode of the silicon junction type, which requires a minimum forward voltage of 0.5 volt thereacross to conduct and a transistor of the germanium junction type which requires a minimum forward voltage of approximately 0.1 volt between its emitter and base to conduct. It will be apparent that the minimum voltage of the diode determines the threshold of the rectifier-amplifier. Upon the A.C. signal from device 10 rising above such threshold the transistors are driven into conduction and a rectified and amplified current flows through the series push-push fed circuit.

If desired, further amplification or raising of the D.C. power level may be provided by an amplification stage 53, including the hereinbefore mentioned resistor 46 in the D.C. circuit of transistors 18 and 26. Amplification stage 53 comprises a transistor 54 having a collector 56, emitter 58, and base 60. The utilization device 62 intended to be controlled by switch device 10, such as an explosive squib, relay, or the like, is represented by block including a resistance therein. Collector 56 is connected to the negative terminal of battery 44 through a current limiting resistor 64 for protection of the transistor, and utilization device 62. Emitter 58 is connected to an intermediate tap 66 of battery 44, and applies a positive potential less than that at the positive side of the battery to the emitter. The base 60 is connected to junction point 40 with the result that the potential at the positive side of battery 44 is applied to the base through resistor 46 and diode 42, subject to an insignificant voltage drop across the diode. The existence of a more positive potential at base 60 than at emitter 58 maintains transistor 54 "cut off." Upon conduction of transistors 18 and 26, their current flow produces a voltage drop across resistor 46, which in turn lowers the potential at base 60 below the potential at emitter 58, rendering transistor 54 conductive. Transistor 54 is of a power type which provides a large current through its emitter to collector path for actuation of utilization device 62.

The structure and operation of such rectifier and amplifier, as will be appreciated, is essentially different from the diode bridge and separate D.C. amplifier of the Wheeler application, S.N. 784,002, and Saholt and Stoehr application, S.N. 8,201, since temperature sensitivity of the operational threshold is dependent upon single diode 42, only, and therefore is reduced by a factor of one-half. Also, the circuit arrangement by which the load circuit extends through the diode provides positive control of any leakage currents of the transistor and promotes a more stable "off bias" before switch-over and a more stable clipping level.

While it is to be understood that circuit specifications will vary according to any design considerations, the following list of components is included by way of example, only, for the described circuit:

| | |
|---|---|
| Transistors 18, 26 | Germanium junction type 4JD1A17 or 2N43A. |
| Transistor 54 | Power type H6 or 2N540A. |
| Diode 42 | Silicon junction diode type HD6006. |
| Resistors *36a*, *36b* | Matched to circuit 10, a typical value being 110–225 ohms each. |
| Resistor 46 | 5,100 ohms. |
| Capacitor 52 | 2.0 microfarads. |
| Resistor 50 | 470 ohms. |
| Resistor 64 | 40 ohms. |
| Battery 44 | 24 volts. |
| Potential at tap 66 | 12 volts. |

Obviously many modifications and variations of the present invention are possible in the light of the above teachings. It is therefore to be understood that within the scope of the appended claims the invention may be practiced otherwise than as specifically described.

What is claimed is:

1. A rectifier-amplifier comprising, a balanced center tapped impedance, first and second transistors of like type having their emitters connected to a first common circuit point, their collectors connected to a second common circuit point and their respective bases connected to one and the other ends of said impedance, a diode connected between the center tap of the balanced input and said second common circuit points and poled to conduct in the direction of forward current flow of said transistors, a third transistor having its base connected to said second circuit point, a source of direct current potential adapted to apply an operating potential to said first and second transistors and to apply a cut off bias potential to said third transistor, said source of direct current potential being applied to said center tap of the balanced input through a dropping resistor, whereby an alternating current signal applied to said balanced impedance of a magnitude sufficient to cause conduction through said diode will drive said transistor in push-pull relationship and cause the voltage at the base of said third transistor to drop permitting same to conduct.

2. A circuit in accordance with claim 1 wherein the minimum forward conducting voltage of said diode exceeds the minimum forward conducting voltage between the base and emitter electrodes of said first and second transistors.

3. A circuit in accordance with claim 2, said resistor and said cut-off bias potential being so chosen that said drop in voltage at the base of the third transistor drives the third transistor into saturation upon conduction through said diode.

4. A circuit in accordance with claim 1 wherein said source of direct current potential applies a predetermined potential between the end of the dropping resistor remote from the center tap and the second common circuit point, and applies a fraction of said predetermined potential across the emitter and collector of said third transistor.

5. A circuit in accordance with claim 4, and a filtering capacitor connected between the base of said third transistor and said second common circuit point.

6. A circuit in accordance with claim 1 wherein said balanced center tapped impedance is a resistor.

References Cited in the file of this patent

UNITED STATES PATENTS

| | | |
|---|---|---|
| 2,881,332 | Jensen | Apr. 7, 1959 |
| 2,883,539 | Bruck et al. | Apr. 21, 1959 |
| 2,985,772 | Pittman et al. | May 23, 1961 |
| 3,072,838 | Hetzler et al. | Jan. 8, 1963 |